United States Patent [19]

Ng

[11] Patent Number: 5,136,536
[45] Date of Patent: Aug. 4, 1992

[54] FLOATING-POINT ALU WITH PARALLEL PATHS

[75] Inventor: Kenneth Y. Ng, Saratoga, Calif.

[73] Assignee: Weitek Corporation, Sunnyvale, Calif.

[21] Appl. No.: 518,452

[22] Filed: May 4, 1990

[51] Int. Cl.$^5$ .............................................. G06F 7/38
[52] U.S. Cl. ................................................... 364/748
[58] Field of Search ....................................... 364/748

[56] References Cited

U.S. PATENT DOCUMENTS

| | | | |
|---|---|---|---|
| 4,592,006 | 5/1986 | Hagiwara et al. | 364/748 |
| 4,719,589 | 1/1988 | Tanaka | 364/748 |
| 4,796,218 | 1/1989 | Tanaka et al. | 364/748 |
| 4,852,039 | 7/1989 | Maheshwari et al. | 364/748 |
| 4,999,803 | 3/1991 | Turrini et al. | 364/748 |

Primary Examiner—Tan V. Mai
Attorney, Agent, or Firm—Townsend and Townsend

[57] ABSTRACT

A method and apparatus for improving the speed of a floating-point arithmetic logic unit (ALU) by arranging the logic to provide two parallel paths, each performing four functions. Six different functions are performed, and thus there is a duplication of two functions. However, each path requires only four functions, thus reducing the throughput from six to four functions. Logic circuitry is provided to determine whether the exponents of the operands are close or not, and thus select one or the other of the two paths. The fractions of the operand are processed on the two paths in parallel while the logic is determining which path to select. This determination can thus be done in parallel, with the selection being done by a multiplexer at the end of the two parallel paths.

6 Claims, 2 Drawing Sheets

FLOATING-POINT ALU WITH PARALLEL PATHS

BACKGROUND OF THE INVENTION

The present invention relates to an arithmetic logic unit (ALU) for doing floating-point calculations on numbers having a fraction and an exponent.

In an ALU for floating-point arithmetic, any operation can be broken down to an addition or substraction, with the subtraction being an addition after one of the numbers has been complemented. Six basic operations are performed on the operands in series as set forth below:

(a) exponent compare;
(b) pre-alignment (right shifting of the fraction of the number with the smaller exponent);
(c) complementation of one of the fractions if doing subtraction;
(d) addition of both fractions;
(e) post-normalization (left shifting of the result fraction until all leading zeroes are removed); and
(f) updating the result exponent by the amount the fraction was shifted.

The first step, (a) exponent compare, is used to determine which of the other steps are needed. In particular, step (b), pre-alignment, is not needed if the exponents are close. Thus, the operand is simply passed through the pre-alignment circuitry without shifting. The operands pass through stages for all of these operations in series.

SUMMARY OF THE INVENTION

The present invention is a method and apparatus for improving the speed of a floating-point ALU by arranging the logic to provide two parallel paths, each performing four functions. Six different functions are performed, and thus there is a duplication of two functions. However, each path requires only four functions, thus reducing the throughput from six to four functions. Logic circuitry is provided to determine whether the exponents of the operands are close or not, and thus select one or the other of the two paths. The fractions of the operands are processed on the two paths in parallel while the logic is determining which path to select. This determination can thus be done in parallel, with the selection being done by a multiplexer at the end of the two parallel paths.

The operations performed in the two paths are as follows:

Path A (a) exponent compare;
(b) pre-alignment;
(c) complementation of shifted fraction if doing subtraction; and
(d) addition of the two fractions.

Path B (a) complementation of fractions if doing subtraction;
(b) addition of the two fractions;
(c) post-normalization; and
(d) exponent updated by shift amount.

The invention allows parallel computation (as represented by Path A and Path B) in place of the sequential computation of the prior art.

The present invention thus increases the speed of a floating-point ALU by reducing the number of operations which need to be performed in series, at the cost of additional circuitry for performing operations in parallel.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
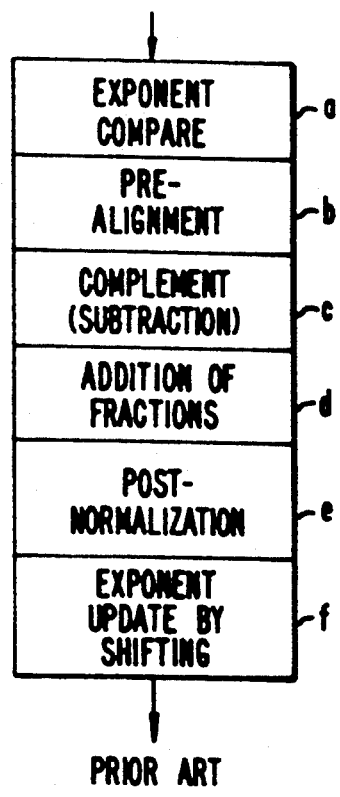
FIG. 1 is a diagram of the six operations performed in series in the prior art.

FIG. 1 is a diagram of the prior-art operations for a floating-point ALU. In a first step (a), the exponents of the two operands are compared. If the operands differ by more than a predetermined number (such as one), a pre-alignment step (b) is done. This alignment step involves shifting the decimal point on one of the operand fractions so that the two numbers would have the same exponent. If no pre-alignment is necessary, the operand is simply passed through the prealignment circuitry without being shifted. In step (c), the fraction of one of the operands is complemented if it is a subtraction operation. In step (d), the two fractions are added together. In step (e), a post-normalization operation is performed. This basically involves determining how many leading zeroes there are in the result of the addition so that the decimal can be moved to remove leading zeroes. The moving of the decimal requires the updating of the exponent by shifting (step (f)).

Figure 2:
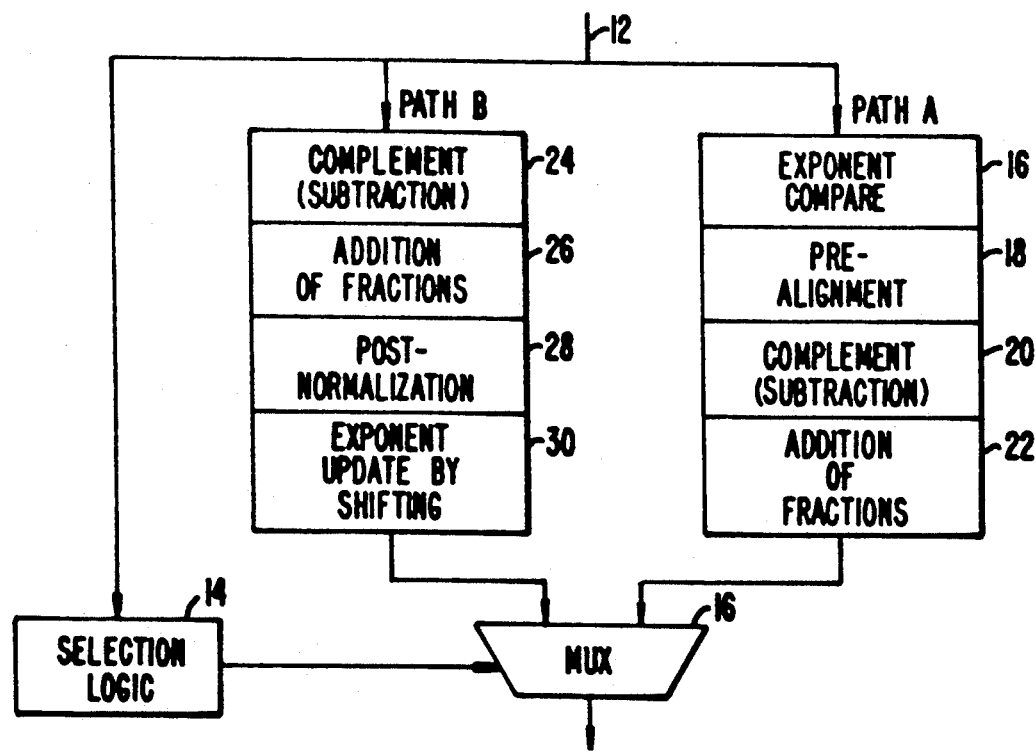
FIG. 2 is a diagram of the parallel operations of the present invention.

FIG. 2 is a diagram of the parallel paths of the present invention. An operand is provided on an input 12 to a path A and a path B. The exponents of the operands are also provided to selection logic 14. Selection logic 14 will compare the exponents in parallel with the fractions being processed through paths A and B. Upon the completion of the comparison by selection logic 14, multiplexer 16 will receive a select signal to select one or the other of paths A and B, depending upon the result of the exponent comparison.

Path A processes the two fractions of the operands on the assumption that the exponents differ by more than the predetermined amount (preferably one). Thus, a first block 16 requires an exponent comparison. This would actually be done by the same logic as for selection logic 14, but is shown differently for ease of understanding. Upon the exponent comparison being completed, a pre-alignment of one of the fractions must be done in block 18 to align the fractions, with the amount of shifting for the alignment being determined by the exponent comparison. Next, a block 20 will complement one of the operands if it is a subtraction operation. Finally, a block 22 will add the two fractions and provide the result to multiplexer 16.

Path B, on the other hand, assumes that the exponents differ by one or less, and that no alignment is necessary. Path B thus eliminates the exponent comparison and pre-alignment steps and goes directly to a block 24 for complementing the two fractions if it is a subtraction operation. The two fractions are then added in a separate block 26. The post-normalization is then done on a block 28 to determine how much the exponent must be shifted. The exponent is then updated by shifting in a block 30. It should be noted that the post-normalization and exponent update blocks 28 and 30 are not necessary for path A, since an exponent comparison and pre-alignment were done in path A, thus ensuring that the result of the operation will not need to be normalized.

The time savings in path B thus comes by eliminating the need to wait for the exponent comparison before proceeding and eliminating the need to pass through any pre-alignment logic. In addition, path A has a time savings by eliminating the need to pass through post-normalization and exponent update logic. Since selection logic 14 does the comparison of the exponents in parallel with processing through path B, if path B is selected, its output can be provided through multiplexer 16 as soon as the four blocks accomplish their functions. The exponent comparison is done in parallel in the selection logic 14, thus it will not slow up the speed of the operation.

Figure 3:
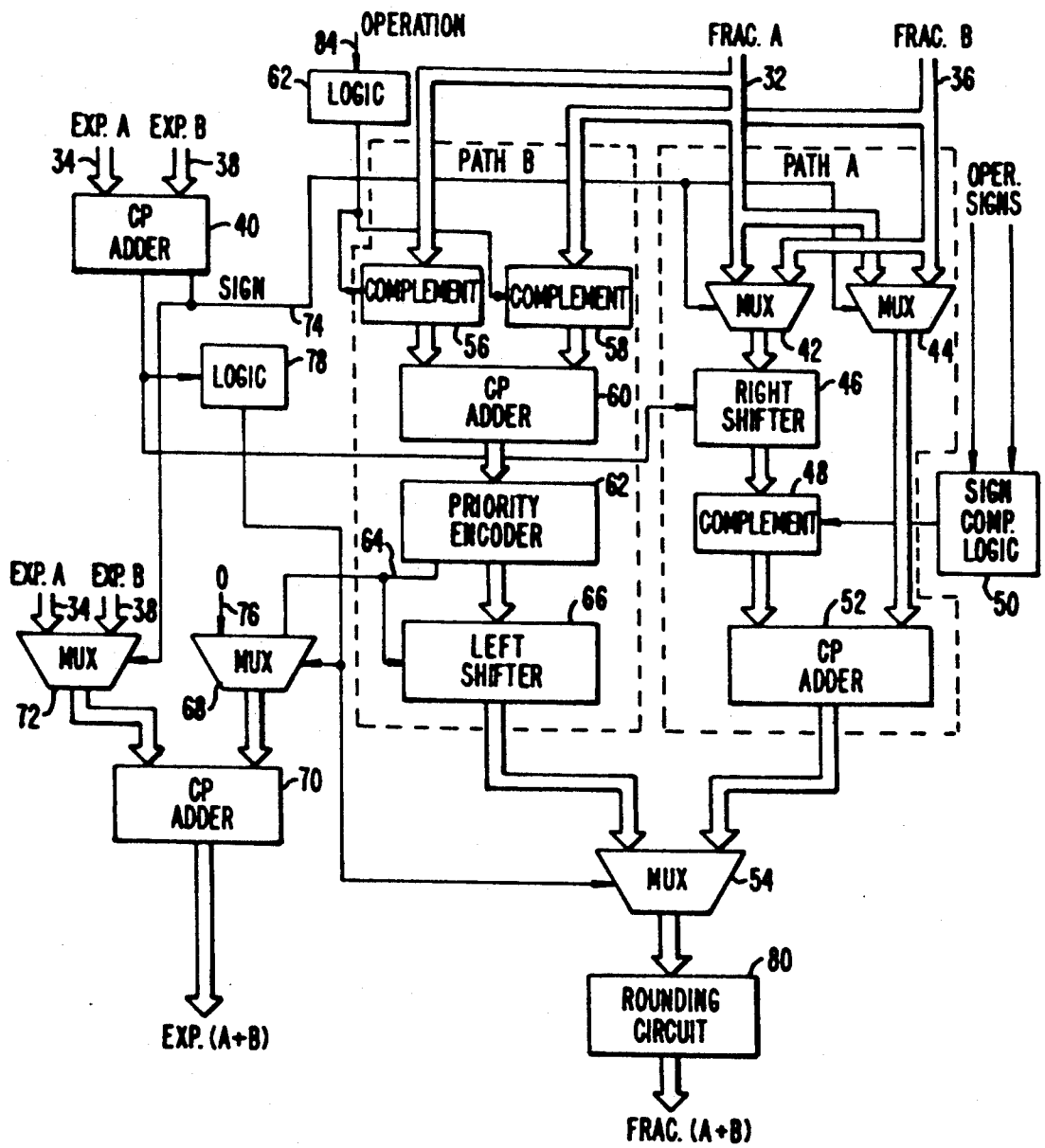
FIG. 3 is a block diagram of the logic circuitry for implementing the parallel operations of FIG. 2.

FIG. 3 is a block diagram of a circuit implementing the parallel structure of FIG. 2. A first operand A has its fraction provided on an input bus 32 and its exponent provided on an input bus 34. A second operand B has its fraction provided on an input bus 36 and its exponent provided on an input bus 38. The input fractions A and B on buses 32 and 36 are provided both to a path A and path B. The two exponents from buses 34 and 38 are compared in a CP (carry-propagate) adder 40. CP adder 40 actually subtracts the two exponents from each other. The subtraction result will have a value and a sign. The sign will indicate which of the exponents was larger. If A was larger than B, the sign will be positive. If A was smaller than B, the sign will be negative. CP adder 40 does the exponent comparison of block 16 of FIG. 2 as well as the exponent comparison for the selection logic 14.

The sign signal from CP adder 40 is provided to multiplexers 42 and 44 in path A. The sign signal thus causes the smaller fraction of fractions A and B to be provided through MUX 42 to a right shifter 46. Right shifter 46 provides the pre-alignment function of block 18 of FIG. 2. The output of right shifter 46 is provided to a complementer 48, which performs the complementing of block 20 of FIG. 2. Complementer 48 is enabled by comparison logic 50, which compares the sign of the two operands and enables the complementing function when the sign of the two numbers is different. If both numbers are negative or positive, no complementing is done. Sign comparison logic 50 does an exclusive OR comparison of the two signs of the A and B operands.

The larger number, which is provided to multiplexer 44, is not shifted or complemented and is provided directly to one input of CP adder 52. The other input of CP adder 52 is provided from the output of complementer 48. The output of CP adder 52 is provided to a multiplexer 54, which performs the function of multiplexer 16 of FIG. 2.

For path B, the two fractions are provided through complementers 56 and 58 to a CP adder 60. Complementers 56 and 58 perform the function of block 24 of FIG. 2. The complementers are activated by a signal from a logic circuit 62 if a subtraction operation is being done. Since both numbers are very close to each other, both are simply complemented for a subtraction. Logic circuit 62 receives an input on a line 84 indicating the type of operation to be performed on the operands. If this operation is a subtraction, it will enable complementers 56 and 58. An external source (such as a microprocessor) thus must provide the operands (in sign, fraction and exponent form) and the type of operation to be performed.

CP adder 60 does the addition of fractions in path B (the function of block 26 of FIG. 2). A priority encoder 62 performs the post-normalization function of block 28 of FIG. 2. This logic circuit counts the number of leading zeroes in the result of the addition. The result is provided on a bus 64 to a left shifter 66 and a multiplexer 68. Left shifter 66 adjusts the fraction so that the leading zeroes are moved to the left of the decimal point. The output of left shifter 66 is then provided to multiplexer 54.

The amount of this shift is provided through multiplexer 68 to a CP adder 70 to be added to the larger of the two exponents of the operands provided from a multiplexer 72. The sign signal on line 74 from the comparison of the exponents selects the exponent which is larger through multiplexer 72. Multiplexer 68 selects the input on line 64 if path B is used, and otherwise selects a second input of a zero value on a second input 76. The select signal for multiplexer 68 is provided from a logic circuit 78 which performs the rest of the function of selection logic 1 of FIG. 2. Logic 78 looks at the output of CP adder 40 to determine if the two exponents of the operands differ by more than one. If they do differ by more than one, path A is selected by a signal to multiplexer 54, and input 76 of multiplexer 68 is also selected. If the exponents differ by less than one, path B is selected by the input to multiplexer 54, and the input 64 to multiplexer 68 is selected.

The output of CP adder 70 will be the exponent for the result of the operation of the ALU. The output of multiplexer 54 is rounded in a rounding circuit 80, with its output being the fractional part of the result. The rounding circuit might, for instance, reduce the number of digits in a large, internal bus to the amount of digits acceptable by the output.

As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims.

What is claimed is:

1. An apparatus for performing floating-point arithmetic operations comprising:
    a) a first processing path;
    b) a second processing path in parallel with said first processing path;
    c) a bus for providing first and second operands to said first and second parallel processing paths;
    d) said first path including
        1) means for comparing the exponents of said operands,
        2) means for aligning the fractions of said operands in accordance with the results of said means for comparing,
        3) means for complementing one of said fractions if said operation requires subtraction, and
        4) first means for adding said functions;
    e) said second path including
        1) means for complementing at least one of said fractions if said operation requires subtraction,
        2) second means for adding said fractions, 3) means for normalizing the result of said adding, and 4) means for modifying a result exponent in response to said means for normalizing; and f) means for selecting the result of one of said first and second paths based on a comparison of said exponents of said operands.

2. The apparatus of claim 1 wherein said means for aligning comprises a right shifter.

3. The apparatus of claim 1 wherein said first and second means for adding comprise carry-propagate adders.

4. The apparatus of claim 1 wherein said means for selecting comprises:

a multiplexer coupled to the outputs of said first and second processing paths;

a carry-propagate adder for subtracting the exponents of said operands; and a logic circuit for providing a select signal to said multiplexer for selecting said first path if the output of said carry propagate adder shows that said exponents differ by more than one.

5. The apparatus of claim 1 further comprising:

a multiplexer having inputs coupled to receive the exponents of said operands; and logic means for comparing said exponents and providing a select signal to said multiplexer to select the larger of said exponents, said larger exponent being provided to an output of said apparatus as a result exponent.

6. The apparatus of claim 5 further comprising a carry-propagate adder having a first input coupled to an output of said multiplexer and a second input coupled to an output of said means for modifying a result exponent.

* * * * *